US008471820B2

(12) United States Patent
Holman, IV et al.

(10) Patent No.: US 8,471,820 B2
(45) Date of Patent: Jun. 25, 2013

(54) PIVOTABLE DISPLAY GUIDE MECHANISM FOR AN ELECTRONIC MOBILE DEVICE

(75) Inventors: Martin Earl Holman, IV, West Palm Beach, FL (US); Bruce Alan Ivanik, Boca Raton, FL (US); Douglas Wayne Moskowitz, Weston, FL (US)

(73) Assignee: Research In Motion Limited, Waterloo, Ontario (CA)

( * ) Notice: Subject to any disclaimer, the term of this patent is extended or adjusted under 35 U.S.C. 154(b) by 280 days.

(21) Appl. No.: 13/073,630

(22) Filed: Mar. 28, 2011

(65) Prior Publication Data

US 2012/0249428 A1    Oct. 4, 2012

(51) Int. Cl.
*G06F 3/02* (2006.01)
*G09G 5/00* (2006.01)

(52) U.S. Cl.
USPC .......................................... 345/169; 345/173

(58) Field of Classification Search
USPC .................................. 345/156, 168, 169, 173
See application file for complete search history.

(56) References Cited

U.S. PATENT DOCUMENTS

| 7,050,767 | B2 | 5/2006 | Hickey et al. |
| 7,117,564 | B2 | 10/2006 | Jeong |
| 7,159,833 | B2 | 1/2007 | Kato |
| 7,184,805 | B2 | 2/2007 | Cho et al. |
| 7,376,450 | B2 | 5/2008 | Chen |
| 7,419,099 | B2 | 9/2008 | Lee et al. |
| 7,492,892 | B2 | 2/2009 | Lee et al. |
| 7,496,194 | B2 | 2/2009 | Jeun |
| 7,496,389 | B2 | 2/2009 | Cho et al. |
| 7,529,571 | B2 | 5/2009 | Byun et al. |
| 7,567,830 | B2 | 7/2009 | Hur |
| 7,577,466 | B2 | 8/2009 | Kim |
| 7,580,734 | B2 | 8/2009 | Ahn et al. |
| 7,580,736 | B2 | 8/2009 | Ronkko et al. |
| 7,624,477 | B2 | 12/2009 | Chien et al. |
| 7,869,840 | B2 | 1/2011 | Kim et al. |
| 7,877,122 | B2 | 1/2011 | Yamamoto et al. |
| 2004/0203527 | A1 | 10/2004 | Matsumoto |

(Continued)

FOREIGN PATENT DOCUMENTS

| EP | 1914962 A2 | 4/2008 |
| EP | 1926291 A2 | 5/2008 |

(Continued)

OTHER PUBLICATIONS

European Patent Office, Extended European Search Report, Application No. EP 11160749, Jul. 4, 2012.

(Continued)

*Primary Examiner* — Ricardo L Osorio
(74) *Attorney, Agent, or Firm* — Quarles & Brady LLP (57) ABSTRACT

An electronic mobile device includes a base and a pivotable assembly that is pivotable relative to the base. A linkage connects to the pivotable assembly so as to be pivotable about a first axis and connects to the base so as to be pivotable about a second axis. As such, the pivotable assembly is pivotable relative to the base about the first axis and the second axis. The electronic mobile device further includes a guide mechanism that includes a guide path defined by one of the base and the pivotable assembly. The guide mechanism further includes a guide member supported by the other of the base and the pivotable assembly. The guide member moves along the guide path as the pivotable assembly pivots relative to the base to inhibit the pivotable assembly from simultaneously pivoting about both the first axis and the second axis.

20 Claims, 9 Drawing Sheets

U.S. PATENT DOCUMENTS

| | | |
|---|---|---|
| 2005/0107137 A1 | 5/2005 | Byun et al. |
| 2005/0137000 A1 | 6/2005 | Toh et al. |
| 2005/0186985 A1 | 8/2005 | Im et al. |
| 2007/0242820 A1 | 10/2007 | Tseng |
| 2007/0293283 A1 | 12/2007 | Inubushi et al. |
| 2009/0186663 A1 | 7/2009 | Griffin et al. |

FOREIGN PATENT DOCUMENTS

| | | |
|---|---|---|
| EP | 2222058 A1 | 8/2010 |
| JP | 2008258854 A | 10/2008 |
| WO | WO2006034949 A1 | 4/2006 |
| WO | WO2007069834 A1 | 6/2007 |
| WO | WO2007137448 A1 | 12/2007 |
| WO | 2008030012 A1 | 3/2008 |
| WO | WO2008108594 A1 | 9/2008 |

OTHER PUBLICATIONS

PCMAG.COM Reviews, Cell Phones, LG VX9400, Review Date: Mar. 23, 2007, by Sascha Segan, Copyright 1996-2010 Ziff Davis, Inc.

Fujitsu F-09A Phone with Exercise Monitor and Location Radar Onboard, http://www.varologic.com/blog/post/2009/06/09/Fujitsu-F-09A-mobile-phone.aspx, Copyright 2010 VaroLogic Blog.

U.S. Appl. No. 12/390,646, "Handheld Electronic Device Transitionable Between Different Configurations", filed Feb. 23, 2009.

U.S. Appl. No. 12/758,382, "Handheld Electronic Communication Device Including Touch-Sensitive Display", filed Apr. 12, 2010.

PIVOTABLE DISPLAY GUIDE MECHANISM FOR AN ELECTRONIC MOBILE DEVICE

CROSS-REFERENCE TO RELATED APPLICATION

Not applicable.

STATEMENT OF FEDERALLY SPONSORED RESEARCH OR DEVELOPMENT

Not applicable.

BACKGROUND OF THE DISCLOSURE

The present disclosure generally relates to electronic mobile devices, and more particularly to electronic mobile devices including pivot mechanisms that facilitate motion of a display to landscape and portrait operating configurations relative to a base.

Some types of electronic mobile devices, such as cellular phones and the like, include displays that are pivotable relative to another portion of the device. Such pivotable displays are provided for various reasons, such as revealing keypads that are manipulated to control device operation. Alternatively, some displays are pivotable to provide a landscape operating configuration that is more convenient for certain activities, such as viewing digital videos.

Some electronic mobile devices even include displays that are pivotable about multiple parallel axes to permit the display to move to multiple different operating configurations. For example, some devices include displays that are pivotable to a landscape operating configuration as described above and an extended portrait operating configuration in which a normally-hidden keypad is accessible. However, these devices typically permit a user to simultaneously pivot the display about the multiple parallel axes. As such, the display may not always pivot in an expected manner when a force is applied thereto by a device user. This can lead to frustration if the user perceives the device as unnecessarily difficult to move to the intended configuration.

DETAILED DESCRIPTION OF THE DRAWINGS

According to some embodiments, an electronic mobile device comprises a base and a pivotable assembly that is pivotable relative to the base. A linkage connects to the pivotable assembly so as to be pivotable about a first axis and connects to the base so as to be pivotable about a second axis. As such, the pivotable assembly is pivotable relative to the base about the first axis and the second axis. The electronic mobile device further comprises a guide mechanism that includes a guide path defined by one of the base and the pivotable assembly. The guide mechanism further includes a guide member supported by the other of the base and the pivotable assembly. The guide member moves along the guide path as the pivotable assembly pivots relative to the base to inhibit the pivotable assembly from simultaneously pivoting about both the first axis and the second axis.

The teachings of the present disclosure relate generally to electronic mobile devices, e.g., mobile communication devices such as pagers, cellular phones, global positioning system (GPS) navigation devices and other satellite navigation devices, smart phones, wireless organizers, wireless personal digital assistants (PDA), and tablet computers. The electronic mobile devices could be devices without wireless communication capabilities such as PDAs, electronic gaming devices, digital photograph albums or picture frames, digital cameras, or digital video recorders. It is also possible that the teachings of the present disclosure could be applied to electronic devices other than handheld electronic devices, e.g., notebook computers. In any case, these examples are intended to be non-limiting.

Figure 2:
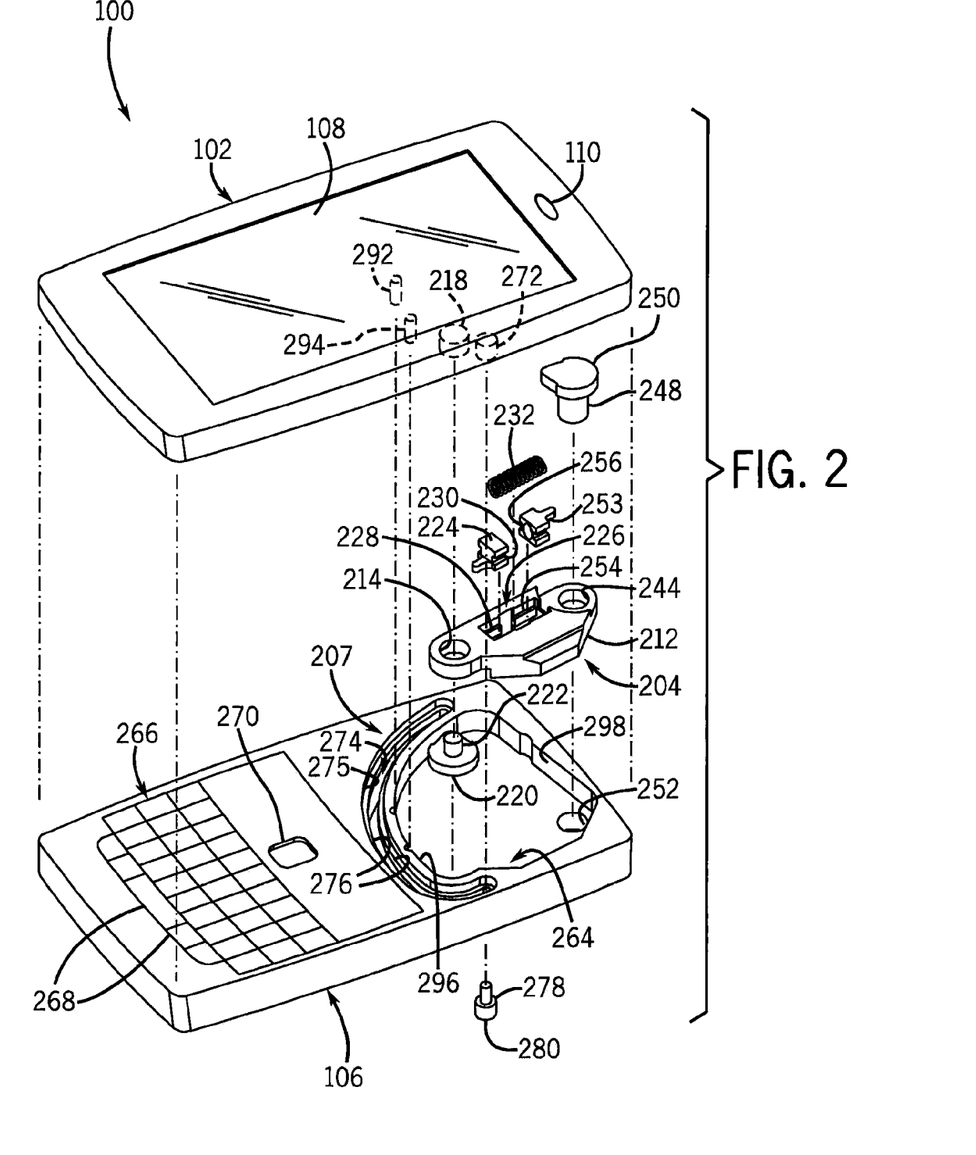
FIG. 2 is an exploded perspective view of the electronic mobile device of FIG. 1.
Figure 4:
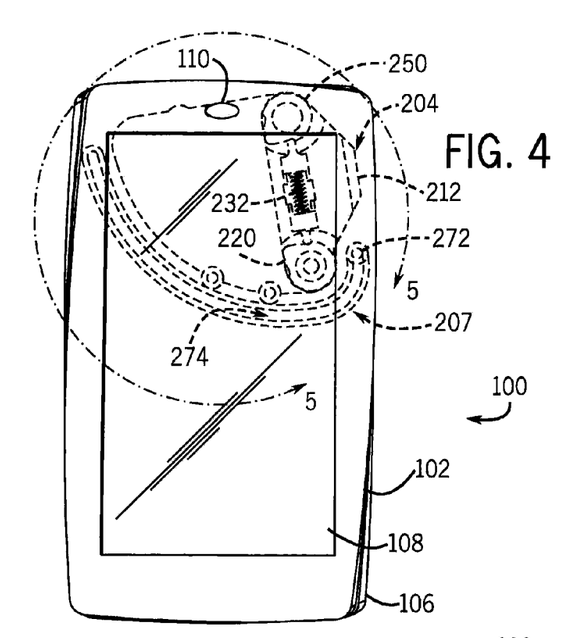
FIG. 4 is a front view of the electronic mobile device of FIG. 1 with the display in a compact operating configuration.
Figure 5:
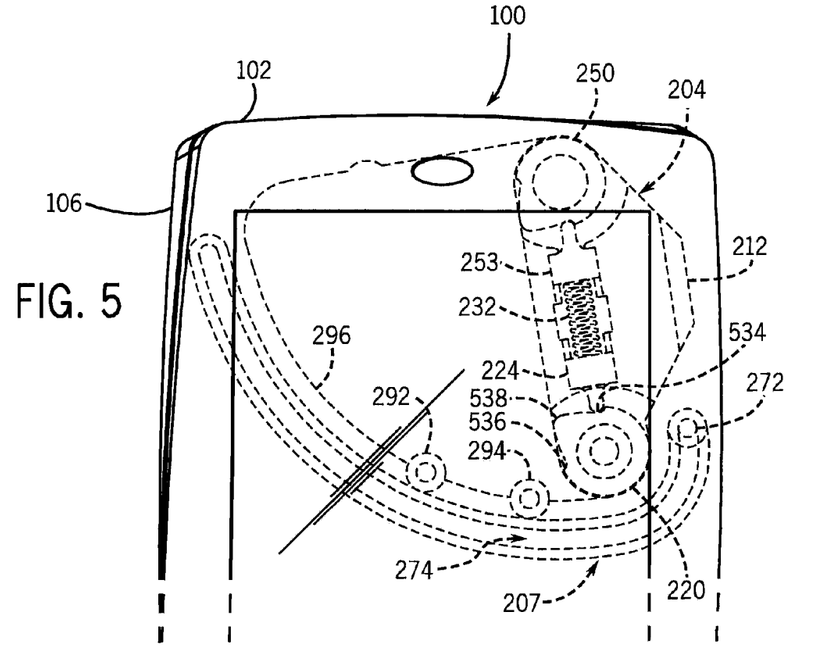
FIG. 5 is a detail view of the electronic mobile device enclosed by line 5-5 of FIG. 4.
Figure 6:
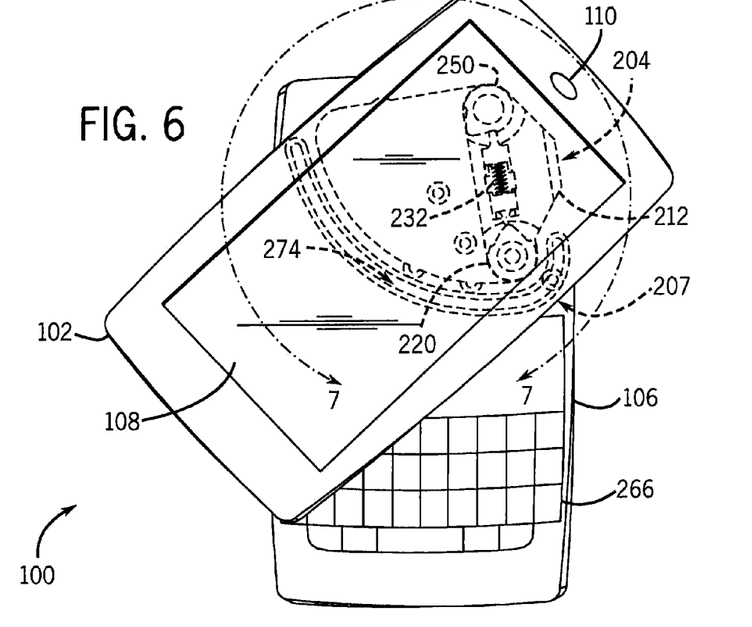
FIG. 6 is a front view of the electronic mobile device of FIG. 1 with the display moving away from the compact operating configuration.
Figure 7:
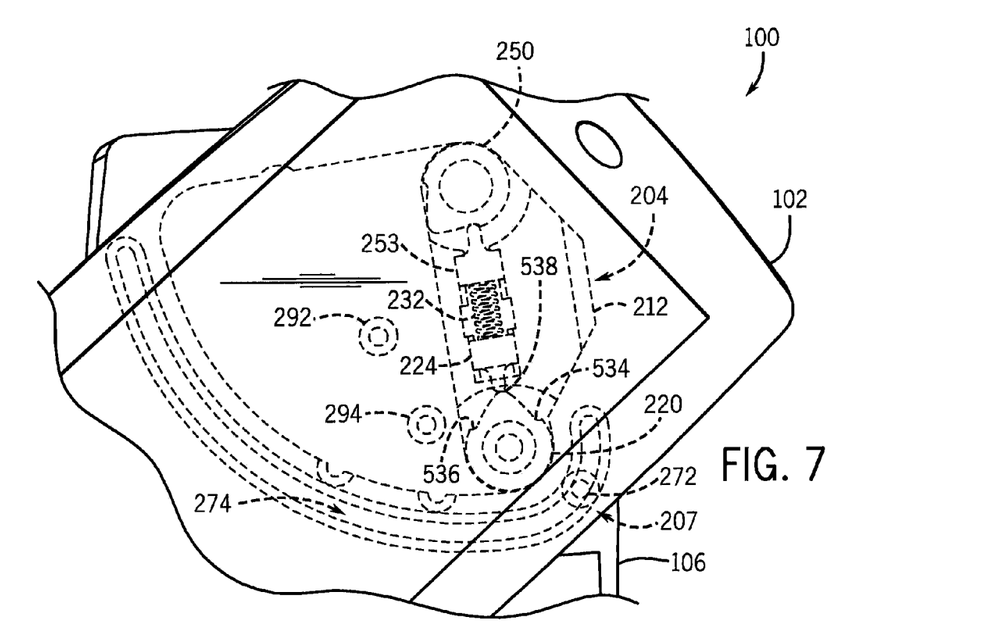
FIG. 7 is a detail view of the electronic mobile device enclosed by line 7-7 of FIG. 6.
Figure 12:
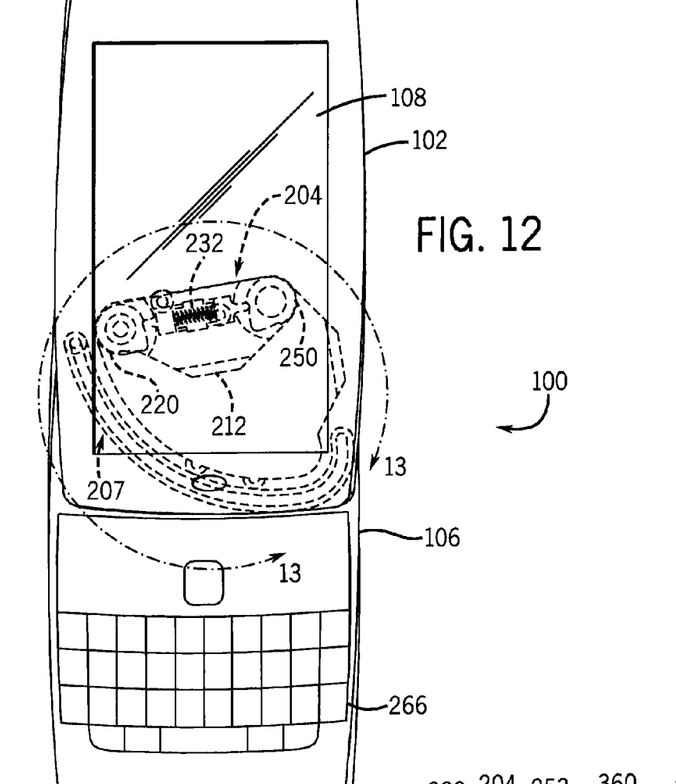
FIG. 12 is a front view of the electronic mobile device of FIG. 1 with the display in a portrait operating configuration.
Figure 13:
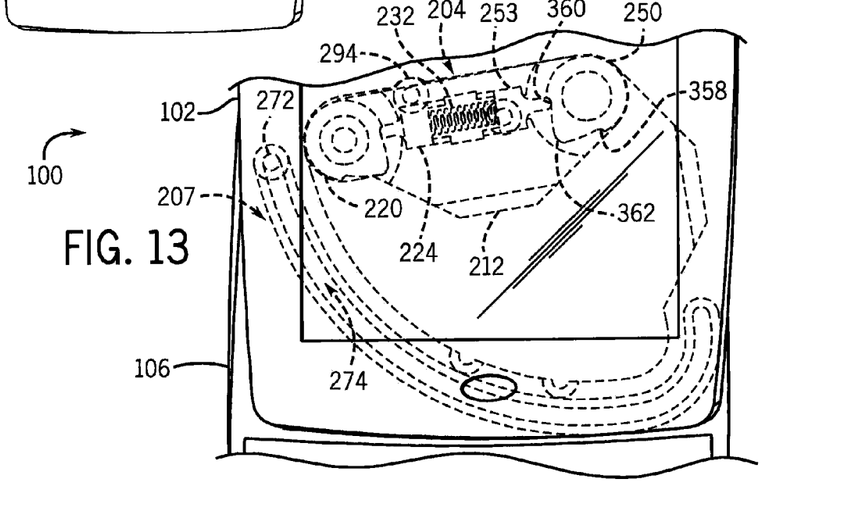
FIG. 13 is a detail view of the electronic mobile device enclosed by line 13-13 of FIG. 12.

Referring generally to the figures, an electronic mobile device 100 includes a pivotable assembly 102 that is pivotably supported by a linkage assembly 204 (FIG. 2) about a first axis. The linkage assembly 204 is in turn pivotably supported by a base 106 about a second axis. As such, the pivotable assembly 102 is pivotable relative to the base 106 about two axes. This construction permits the pivotable assembly 102 to pivot about the first axis from a compact operating configuration (FIGS. 4 and 5) to a landscape operating configuration (FIGS. 8 and 9) and vice versa. The pivotable assembly 102 is also pivotable about the second axis from the landscape operating configuration to a portrait operating configuration (FIGS. 12 and 13) and vice versa. To inhibit the pivotable assembly 102 from simultaneously pivoting about the two axes, the device 100 further includes a guide interface or mechanism 207 (FIG. 2). In the following paragraphs, the pivotable assembly 102, the linkage assembly 204, the base 106, and the guide mechanism 207 are first described in further detail. Thereafter, exemplary tasks that may be performed in the compact, landscape, and portrait operating configurations are described. Finally, communication elements and subsystems of the device 100 are described.

Figure 1:
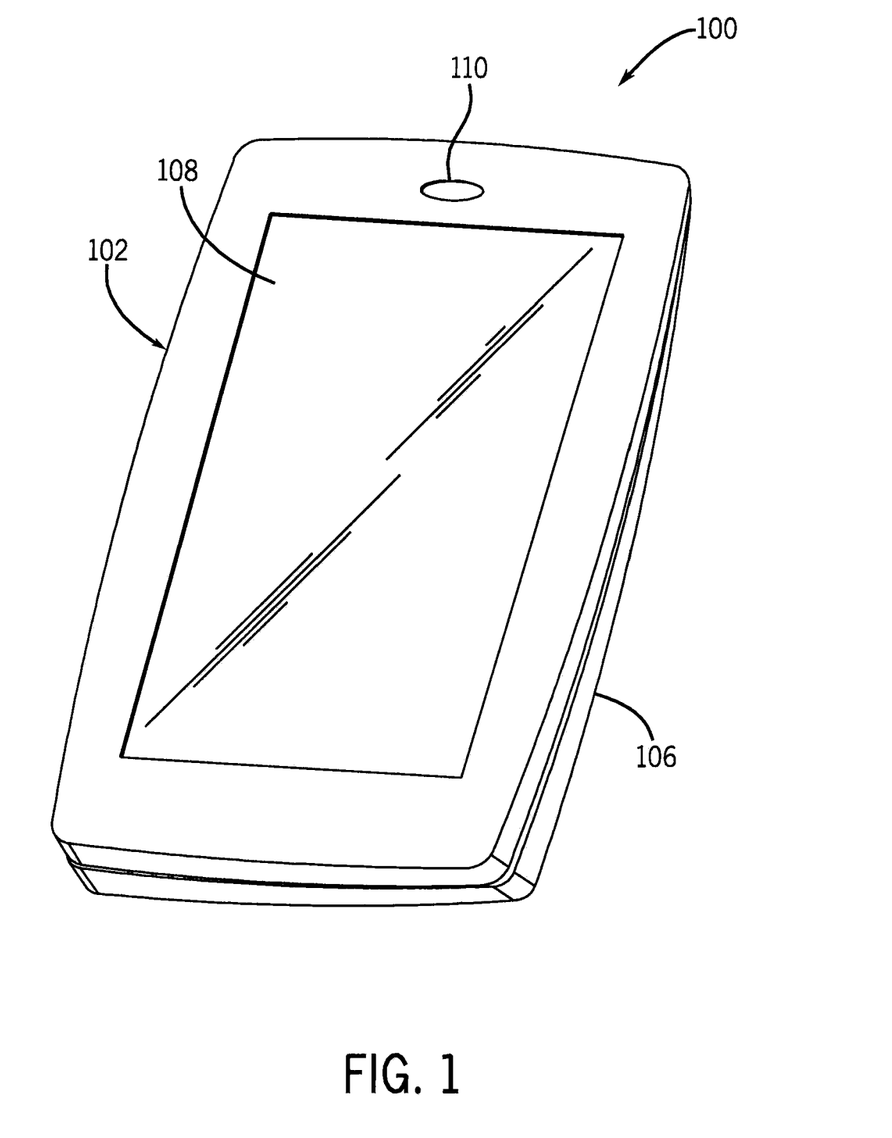
FIG. 1 is a perspective view of an electronic mobile device incorporating a pivotable display guide mechanism.

Referring now to FIGS. 1-2, the pivotable assembly 102 is a generally flat component that includes a user interface device, e.g., a display 108, such as a liquid crystal display (LCD). The display 108 interacts with the communication elements and subsystems described in connection with FIG. 14 to provide visual information to a user. In some embodiments, the display 108 could be a touch-responsive LCD panel such that the pivotable assembly 102 could also serve as an input device. In other embodiments, the user interface device could be a keypad, an optical input device (e.g., an optical trackpad), combinations of these devices with one another or with a display, or the like.

In some embodiments, the pivotable assembly 102 also supports a speaker 110 that interacts with the communication elements and subsystems described in connection with FIG. 14 to provide audible information to a user. Furthermore, in some embodiments the pivotable assembly 102 also supports user-operable components (not shown) on its generally rectangular periphery, such as volume control keys, short cut keys, mute keys, data/power ports, earphone jacks, and the like. These user-operable components may be manipulated by a user to control operation of the electronic mobile device 100.

Figure 3:
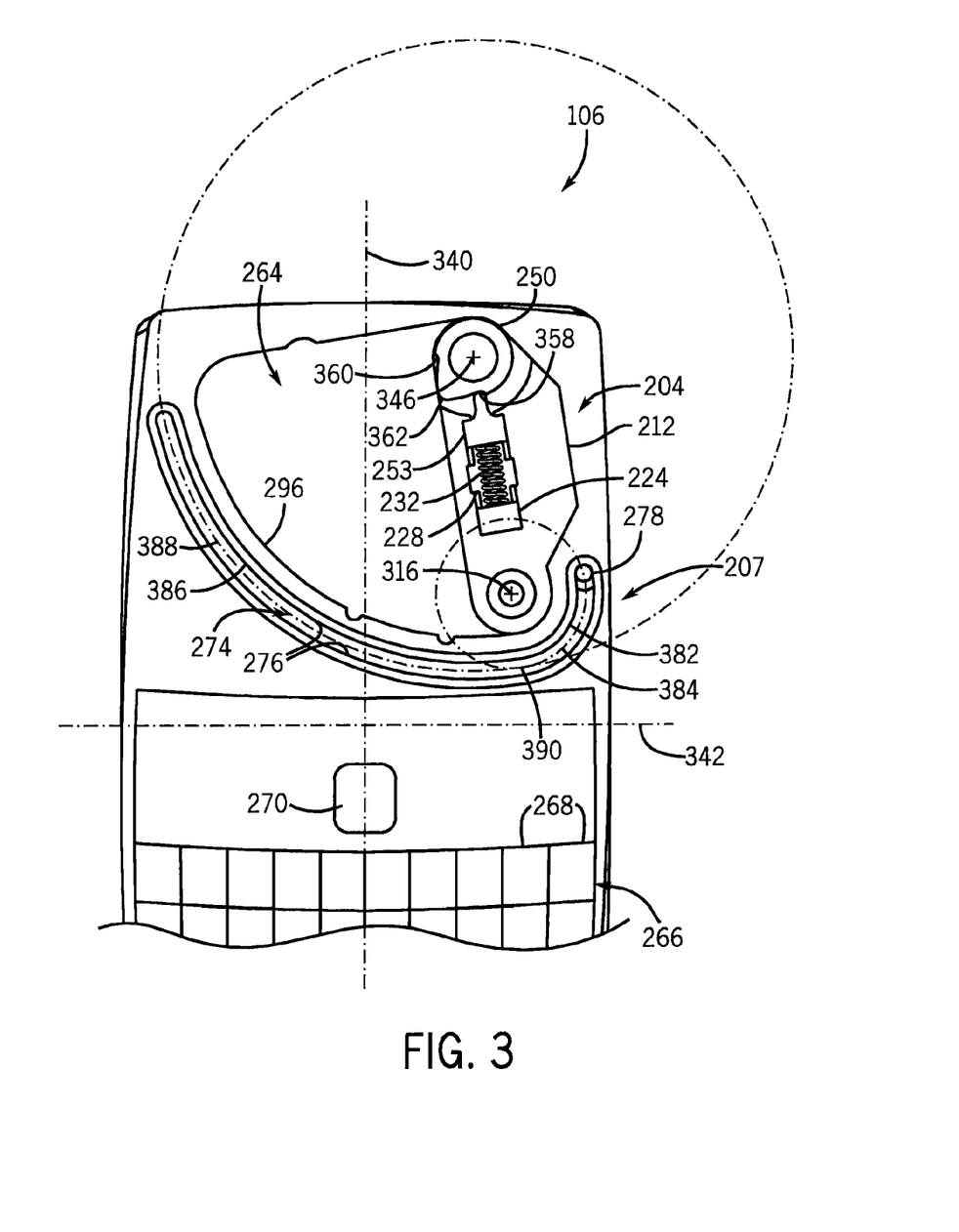
FIG. 3 is a front view of the electronic mobile device of FIG. 1 including two arcs that define the shape of a guide slot of the guide mechanism.

Referring now to FIGS. 2-9, the linkage assembly 204 generally includes a linkage 212 (FIG. 2) that pivotably connects to both the pivotable assembly 102 and the base 106. To pivotably connect to the pivotable assembly 102, the linkage 212 includes a first circular opening 214 that defines, in part, a first or pivotable assembly axis 316 (FIG. 3). A cylindrical post 218 extending from a rear surface of the pivotable assembly 102 extends into the circular opening 214. This construction permits the pivotable assembly 102 to pivot about the first axis 316 relative to the linkage 212 to move from the compact operating configuration (FIGS. 4 and 5) through an intermediate configuration (FIGS. 6 and 7) to the landscape operating configuration (FIGS. 8 and 9) and vice versa.

The linkage assembly 204 also includes components that bias the pivotable assembly 102 to pivot about the first axis 316 toward both the compact operating configuration and the landscape operating configuration. In particular, the linkage assembly 204 includes a first or pivotable assembly cam 220 having a post 222 that extends through the opening 214 and is fixedly received in the cylindrical post 218 (e.g., via an adhesive, fastener, or the like). As such, the first cam 220 pivots with the pivotable assembly 102 about the first axis 316. The first cam 220 engages a first cam follower 224 disposed within a recess 226 defined by the linkage 212. The recess 226 includes guide rails 228 that are received in guide slots 230 on the sides of the first follower 224 to permit the first follower 224 to translate linearly within the recess 226. A compression spring 232 also disposed within the recess 226 biases the first cam follower 224 into engagement with the first cam 220.

The surface of the first cam 220 includes two indentations 534, 536 (FIG. 5) that engage the first cam follower 224 when the pivotable assembly 102 is pivoted to the compact and landscape configurations, respectively. As such, the spring 232 is compressed the least in these configurations and thereby biases the pivotable assembly 102 toward these configurations. In contrast, the surface of the first cam 220 includes a rounded apex 538 between the indentations 534, 536. The apex 538 engages the first cam follower 224 when the pivotable assembly 102 is pivoted to the intermediate configuration (FIGS. 6 and 7) and the spring 232 is compressed a maximum amount in this configuration. As such, when the user moves the pivotable assembly 102 away from one of the stable configurations (i.e., the compact and landscape configurations), the shape of the first cam 220 biases the pivotable assembly 102 toward the closest stable configuration.

In the compact and landscape configurations, the first axis 316 is preferably offset from a longitudinal plane 340 (FIG. 3) and a transverse plane 342 of the device 100. Such an offset permits the pivotable assembly 102 to be positioned symmetrically over the longitudinal plane 340 in the landscape operating configuration. As used herein, the longitudinal plane 340 bisects the display 108 and extends in the direction of the longer dimension of the display 108 (i.e., the height dimension), and the transverse plane 342 bisects the display 108 and extends in the direction of the shorter dimension of the display 108 (i.e., the width dimension). In addition, the longitudinal plane 340 and the transverse plane 342 are substantially perpendicular to each other and a plane extending along the surface of the display 108.

Referring now to FIGS. 2, 3, and 8-13, to pivotably connect to the base 106, the linkage 212 includes a second circular opening 244 opposite the first circular opening 214. The second circular opening 244 defines, in part, a second or base axis 346 (FIG. 3) that is generally parallel to the first axis 316. A post 248 on the rear surface of a second or base cam 250 extends through the second circular opening 244 and into an opening 252 in the base 106 to connect the linkage 212 and the base 106. In addition, this construction permits both the linkage assembly 204 and the pivotable assembly 102 to pivot about the second axis 346 relative to the base 106 to move from the landscape operating configuration (FIGS. 8 and 9) through an intermediate configuration (FIGS. 10 and 11) to the portrait operating configuration (FIGS. 12 and 13) and vice versa.

The linkage assembly 204 further includes components that bias the pivotable assembly 102 to pivot about the second axis 346 toward both the landscape operating configuration and the portrait operating configuration. In particular, the linkage assembly 204 includes the second cam 250 which is fixed relative to the base 106 (e.g., via an adhesive, fastener, or the like). The second cam 250 engages a second or base follower 253 disposed within the linkage recess 226. The recess 226 includes guide rails 254 that are received in guide slots 256 on the sides of the second follower 253 to permit the second follower 253 to translate linearly within the recess 226. The compression spring 232 also engages the second follower 253 to bias the second follower 253 into engagement with the second cam 250.

The surface of the second cam 250 includes two indentations 358, 360 (FIG. 3) that engage the second cam follower 253 when the pivotable assembly 102 is pivoted to the landscape and portrait configurations, respectively. As such, the spring 232 is compressed the least in these configurations and thereby biases the pivotable assembly 102 toward these configurations. In contrast, the surface of the second cam 250 includes a rounded apex 362 between the indentations 358, 360. The apex 362 engages the second cam follower 253 when the pivotable assembly 102 is pivoted to the intermediate configuration (FIGS. 10 and 11) and the spring 232 is compressed a maximum amount in this configuration. As such, when the user moves the pivotable assembly 102 away from one of the stable configurations (i.e., the landscape and portrait configurations), the shape of the second cam 250 biases the pivotable assembly 102 toward the closest stable configuration.

The second axis 346 is preferably offset from the longitudinal plane 340 and the transverse plane 342 of the device 100. Such an offset permits the pivotable assembly 102 to be positioned symmetrically over the longitudinal plane 340 in the portrait operating configuration.

Referring now specifically to FIG. 2, the base 106 is a generally flat and rectangular component that houses communication elements and subsystems such as those described below in connection with FIG. 14. The base 106 also includes a recess 264 that accommodates the linkage assembly 204. Adjacent the recess 264, a lower portion of the base 106 supports a key assembly 266.

The key assembly 266 includes a plurality of keys 268 that define a common keypad layout, such as a QWERTY layout, a QWERTZ layout, an AZERTY layout, a DVORAK layout, or the like. In some embodiments, the key assembly 266 also includes additional user-operable components, such as an optical trackpad 270, a track ball (not shown), a menu button (not shown), an escape button (not shown), and the like. In any case, the key assembly 266 may be manipulated by a user to control operation of the electronic mobile device 100.

In some embodiments, the base 106 also supports user-operable components (not shown) on its rectangular periphery, such as volume control keys, shortcut keys, mute keys, data/power ports, earphone jacks, and the like, that may be manipulated by a user to control operation of the electronic mobile device 100.

Referring now to FIGS. 2 and 3 and as described briefly above, the guide mechanism 207 includes components that inhibit the pivotable assembly 102 from simultaneously pivoting about the first axis 316 and the second axis 346. In particular, the guide mechanism 207 includes a guide member or post 272 extending from the rear surface of the pivotable assembly 102 that moves along a guide path or slot 274 defined by a guide wall 275 of the base 106. To ensure the guide post 272 remains in the guide slot 274, the guide post 272 extends between guide ridges 276 that define a reduced-width section of the guide slot 274. A guide pin 278 engages the guide post 272 below the ridges 276 and includes a head 280 that is larger than the reduced-width section of the guide slot 274. As such, contact between the guide pin head 280 and the ridges 276 inhibits the guide post 272 from moving out of the guide slot 274.

As shown most clearly in FIG. 3, the guide slot 274 also includes multiple sections having different shapes to inhibit the pivotable assembly 102 from simultaneously pivoting about the axes 316, 346. Specifically, the guide slot 274 includes a first path segment 382 that is defined by a first arc 384 (i.e., a segment of a first circle) centered at the first axis 316 and having a first radius. Due to the size and position of the first arc 384, the guide post 272 moves along the first path segment 382 as the pivotable assembly 102 pivots about the first axis 316 relative to the base 106. In contrast, the pivotable assembly 102 does not pivot about the second axis 346 when the guide post 272 is positioned along the first path segment 382 because such a motion would cause the guide post 272 to deviate from the first path segment 382.

The guide slot 274 also includes a second path segment 386 that is defined by a second arc 388 (i.e., a segment of a second circle) centered at the second axis 346 and having a second radius. The second radius is larger than the first radius. Due to the size and position of the second arc 388, the guide post 272 moves along the second path segment 386 as the pivotable assembly 102 and the linkage assembly 204 pivot about the second axis 346 relative to the base 106. In contrast, the pivotable assembly 102 does not pivot about the first axis 316 when the guide post 272 is positioned along the second path segment 386 because such a motion would cause the guide post 272 to deviate from the second path segment 386.

Figure 8:
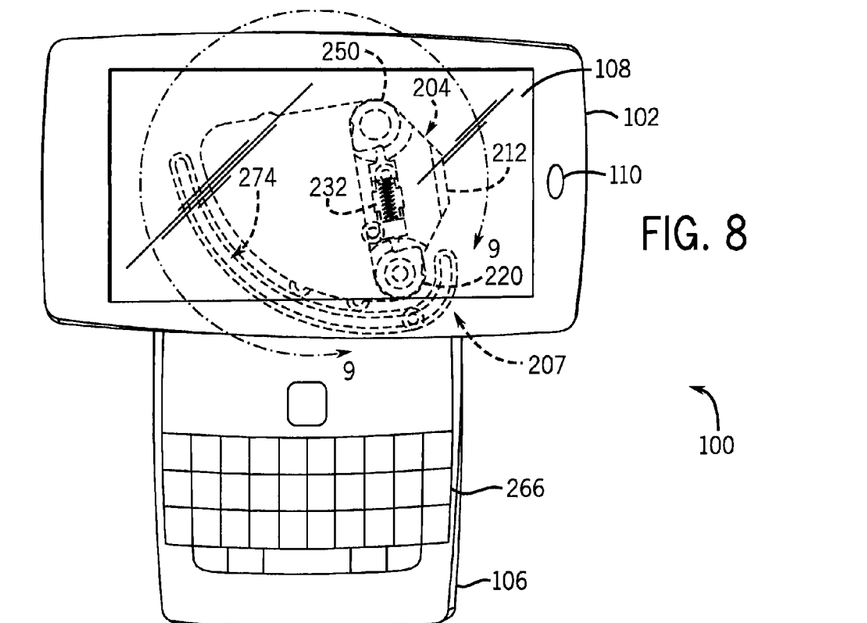
FIG. 8 is a front view of the electronic mobile device of FIG. 1 with the display in a landscape operating configuration.
Figure 9:
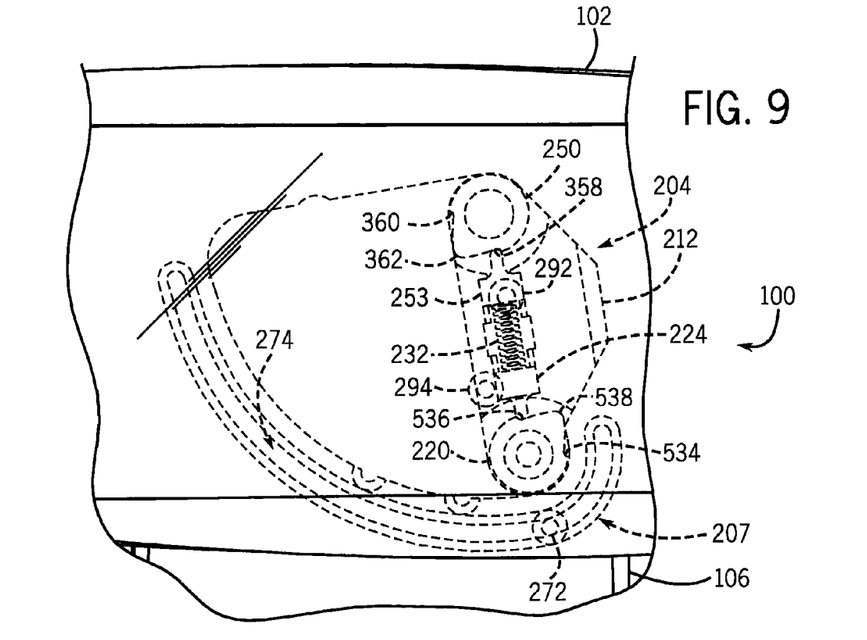
FIG. 9 is a detail view of the electronic mobile device enclosed by line 9-9 of FIG. 8.
Figure 10:
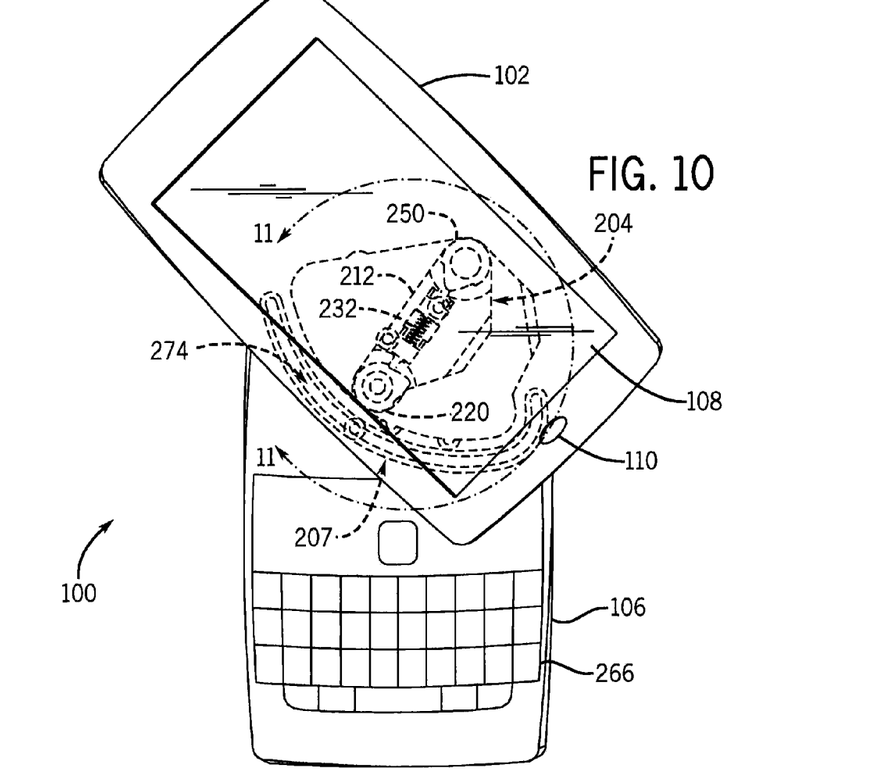
FIG. 10 is a front view of the electronic mobile device of FIG. 1 with the display moving away from the landscape operating configuration.
Figure 11:
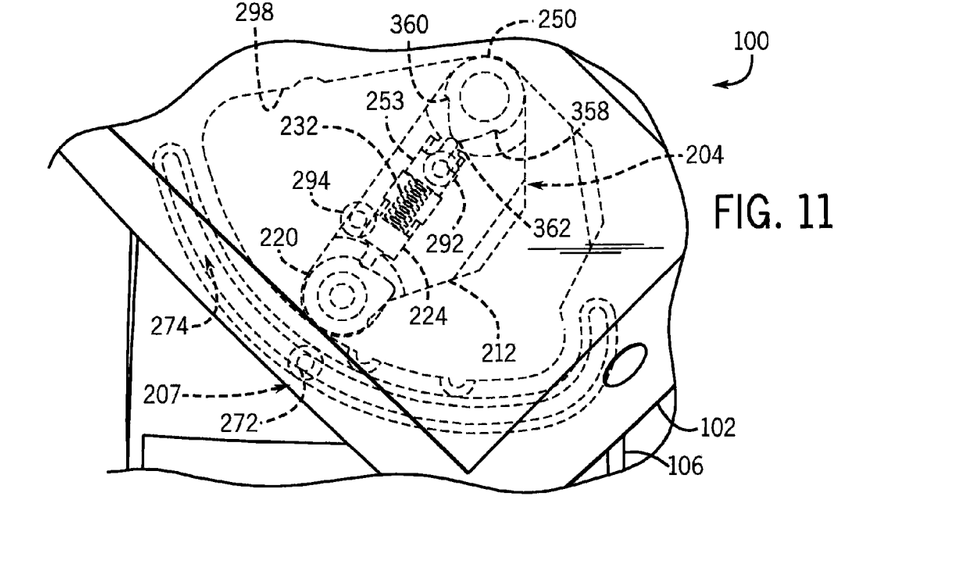
FIG. 11 is a detail view of the electronic mobile device enclosed by line 11-11 of FIG. 10.

To provide a smooth transition from pivoting about the first axis 316 to pivoting about the second axis 346 and vice versa, the first path segment 382 and the second path segment 386 meet at an intersection 390 at which the segments 382, 386 are tangential to each other. The guide post 272 is disposed at the intersection 390 in the landscape operating configuration (FIGS. 8 and 9).

The guide mechanism 207 also includes stops 292, 294 (e.g., posts extending from the rear surface of the pivotable assembly 102) to limit, along with the guide post 272 and slot 274, the range of motion of the pivotable assembly 102 relative to the base 106. In the compact operating configuration, the stops 292, 294 engage a first side wall 296 of the base recess 264 to inhibit the pivotable assembly 102 from pivoting about the first axis 316 relative to the base 106 in a counter-clockwise direction. In the landscape operating configuration, the stop 292 contacts the linkage 212 to inhibit the pivotable assembly 102 from pivoting about the first axis 316 relative to the base 106 in a clockwise direction. In the portrait operating configuration, the stop 294 engages a second side wall 298 (FIG. 11) of the base recess 264 to inhibit the pivotable assembly 102 from pivoting about the second axis 346 relative to the base 106 in a clockwise direction.

To summarize, the linkage assembly 204 generally moves and acts as follows when the pivotable assembly 102 moves relative to the base 106. First referring to FIGS. 4-9, the linkage 212 remains stationary relative to the base 106 when the pivotable assembly 102 pivots about the first axis 316 to move from the compact operating configuration to the landscape operating configuration. The first cam 220 simultaneously pivots with the pivotable assembly 102 and displaces the first cam follower 224 and, as described above, the shape of the first cam 220 and the spring 232 bias the pivotable assembly 102 toward the closest stable configuration (i.e., the compact operating configuration or the landscape operating configuration). The guide post 272 also moves along the first path segment 382 as the pivotable assembly 102 moves from the compact operating configuration to the landscape operating configuration. Referring now to FIGS. 8-13, the linkage 212 pivots together with the pivotable assembly 102 as the pivotable assembly 102 pivots about the second axis 346 relative to the base 106 to move from the landscape operating configuration to the portrait operating configuration. The second cam 250 simultaneously remains stationary relative to the base 106 and thereby displaces the second cam follower 253 as the second cam follower 253 pivots with the linkage 212. As described above, the shape of the second cam 250 and the spring 232 bias the pivotable assembly 102 toward the closest stable configuration (i.e., the landscape operating configuration or the portrait operating configuration). The guide post 272 also moves along the second path segment 386 as the pivotable assembly 102 moves from the landscape operating configuration to the portrait operating configuration. The linkage assembly 204 acts in a similar manner when moving from the portrait operating configuration to the landscape operating configuration and from the landscape operating configuration to the compact operating configuration.

As the names imply, the device 100 is operable in each of the compact, landscape, and portrait operating configurations. In the compact operating configuration (FIGS. 4 and 5), the pivotable assembly 102 directly overlies the base 106. As such, this configuration may be useful for viewing relatively simple information, such as the identity of a person placing a call to the device 100 or SMS messages, and for storing the device 100. In embodiments in which the user interface device includes one or more input devices (e.g., touch-responsive displays, keypads, or the like), the compact operating configuration may also be useful for various other tasks, such as composing e-mail messages, placing phone calls, browsing the internet, using applications, and the like. The landscape operating configuration (FIGS. 8 and 9) may be useful for various tasks in which access to the key assembly 266 is preferred, such as composing e-mail messages, browsing landscape-oriented webpages, using landscape-oriented applications, and the like. Similarly, the portrait operating configuration (FIGS. 12 and 13) may be useful for various tasks in which access to the key assembly 266 is preferred, such as browsing portrait-oriented webpages, using portrait-oriented applications, and the like. The portrait operating configuration also provides an ergonomically appropriate position for conducting a voice call, and moving the pivotable assembly 102 to the portrait operating configuration may be used to answer an incoming call instead of the key assembly 266. Each of the operating configurations may also be used for other tasks that are not explicitly described above.

The device 100 described above may be modified without departing from the scope of the disclosure. For example, the guide slot 274 could be defined by the pivotable assembly 102 and the guide post 272 could extend from the base 106. Similarly, the linkage 212 could be housed in a recess defined by the rear surface of the pivotable assembly 102. Various other modifications and alternatives may also be employed.

From the above description, it should be appreciated that the pivotable assembly 102 is pivotable about a first axis from a compact operating configuration to a landscape operating configuration and vice versa. The pivotable assembly 102 is also pivotable about a second axis from the landscape operating configuration to a portrait operating configuration and vice versa. Furthermore, the guide mechanism 207 inhibits the pivotable assembly 102 from simultaneously pivoting about both of the axes.

Figure 14:
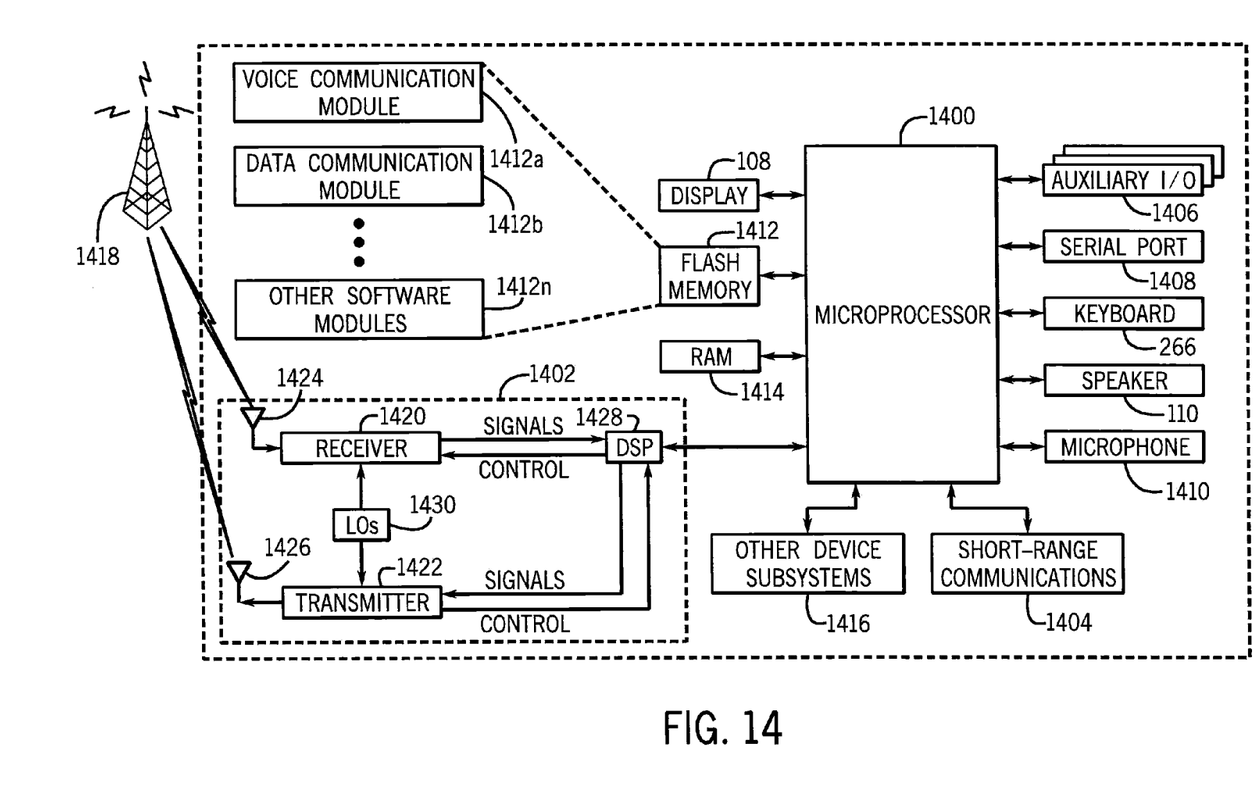
FIG. 14 is a block diagram of communication elements and subsystems of the electronic mobile device of FIG. 1.

Referring now to FIG. 14, a block diagram showing the operative connections of the communication elements and subsystems of the electronic mobile device 100 is illustrated. The electronic mobile device 100 includes a processing device 1400, a communications subsystem 1402, a short-range communications subsystem 1404, input/output devices 108, 1406, 1408, 266, 110, 1410, memory devices 1412, 1414, and various other device subsystems 1416. The electronic mobile device 100 is preferably a two-way communication device having voice and data communication capabilities. In addition, the device 100 preferably has the capability to communicate with other computer systems via the internet.

The processing device 1400 controls the overall operation of the electronic mobile device 100. Operating system software executed by the processing device 1400 is preferably stored in a persistent store, such as the flash memory 1412, but may also be stored in other types of memory devices, such as a read only memory (ROM) or similar storage elements. In addition, system software, specific device applications, or parts thereof, may be temporarily loaded into a volatile store, such as the random access memory (RAM) 1414. Communication signals received by the electronic mobile device 100 may also be stored to RAM 1414.

The processing device 1400, in addition to its operating system functions, enables execution of software applications 1412a-1412n on the device 100. A predetermined set of applications that control basic device operations, such as data and voice communications 1412a, 1412b may be installed on the device 100 during manufacture. In addition, a personal information manager (PIM) application (not shown) may be installed during manufacture. The PIM is preferably capable of organizing and managing data items, such as e-mail, calendar events, voicemails, appointments, and task items. The PIM application is also preferably capable of sending and receiving data items via a wireless network 1418. Preferably, the PIM data items are seamlessly integrated, synchronized and updated via the wireless network 1418 with the device user's corresponding data items stored or associated with a host computer system. An example system and method for accomplishing these steps is disclosed in "System and Method for Pushing Information from a Host System to a Mobile Data Communication Device Having A Shared Electronic Address", U.S. Pat. No. 6,219,694, which is owned by the assignee of the present application, and which is incorporated herein by reference.

Communication functions, including data and voice communications, are performed through the communication subsystem 1402, and possibly through the short-range communications subsystem 1404. The communication subsystem 1402 includes a receiver 1420, a transmitter 1422 and one or more antennas 1424, 1426. In addition, the communication subsystem 1402 also includes a processing module, such as a digital signal processor (DSP) 1428, and local oscillators (LOs) 1430. The specific design and implementation of the communication subsystem 1402 is dependent upon the communication network in which the electronic mobile device 100 is intended to operate. For example, an electronic mobile device 100 may include a communication subsystem 1402 designed to operate with the Mobitex™ DataTAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the electronic mobile device 100.

Network access requirements vary depending upon the type of communication system. For example, in the Mobitex and DataTAC networks, electronic mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the electronic mobile device 100 may send and receive communication signals over the communication network 1418. Signals received by the antenna 1424 from the communication network 1418 are routed to the receiver 1420, which provides for signal amplification, frequency down conversion, filtering, channel selection, etc., and may also provide analog-to-digital conversion. Analog-to-digital conversion of the received signal allows the DSP to perform more complex communication functions, such as demodulation and decoding. In a similar manner, signals to be transmitted to the network 1418 are processed (e.g., modulated and encoded) by the DSP 1428 and are then provided to the transmitter 1422 for digital-to-analog conversion, frequency up conversion, filtering, amplification and transmission to the communication network 1418 (or networks) via the antenna 1426.

In addition to processing communication signals, the DSP 1428 provides for receiver 1420 and transmitter 1422 control. For example, gains applied to communication signals in the receiver 1420 and transmitter 1422 may be adaptively controlled through automatic gain control algorithms implemented in the DSP 1428.

In a data communication mode, a received signal, such as a text message or web page download, is processed by the communication subsystem 1402 and input to the processing device 1400. The received signal is then further processed by the processing device 1400 for output to the display 108, or alternatively to some other auxiliary I/O device 1406. A device user may also compose data items, such as e-mail messages, using the key assembly 266 and/or some other auxiliary I/O device 1406, such as the trackpad 270, a rocker switch, a thumb-wheel, or the like. The composed data items may then be transmitted over the communication network 1418 via the communication subsystem 1402.

In a voice communication mode, overall operation of the device is substantially similar to the data communication mode, except that received signals are output to the speaker 110, and signals for transmission are generated by a microphone 1410. Alternative voice or audio I/O subsystems, such as a voice message recording subsystem, may also be implemented on the device 100. In addition, the display 108 may also be utilized in voice communication mode, for example to display the identity of a calling party, the duration of a voice call, or other voice call related information.

The short-range communications subsystem 1404 enables communication between the electronic mobile device 100 and other proximate systems or devices, which need not necessarily be similar devices. For example, the short-range communications subsystem 1404 may include an infrared device and associated circuits and components, or a Bluetooth™ communication module to provide for communication with similarly-enabled systems and devices.

The various embodiments presented above are merely examples and are in no way meant to limit the scope of this disclosure. Variations of the embodiments described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. An electronic mobile device, comprising:
   a base;
   a pivotable assembly being pivotable relative to the base;
   a linkage connected to the pivotable assembly so as to be pivotable about a first axis and connected to the base so as to be pivotable about a second axis such that the pivotable assembly is pivotable relative to the base about the first axis and the second axis;
   a guide mechanism including:
      a guide path defined by one of the base and the pivotable assembly;
      a guide member supported by the other of the base and the pivotable assembly, the guide member moving along the guide path as the pivotable assembly pivots relative to the base to inhibit the pivotable assembly from simultaneously pivoting about both the first axis and the second axis.

2. The electronic mobile device of claim 1, wherein the guide path includes:
   a first path segment along which the guide member moves relative to the guide path as the pivotable assembly pivots about the first axis relative to the base; and
   a second path segment along which the guide member moves relative to the guide path as the pivotable assembly pivots about the second axis relative to the base.

3. The electronic mobile device of claim 2, wherein the first path segment is defined by a first arc having a first radius, and the second path segment is defined by a second arc having a second radius different than the first radius.

4. The electronic mobile device of claim 3, wherein the first radius is smaller than the second radius.

5. The electronic mobile device of claim 2, wherein the pivotable assembly pivots from a compact operating configuration to a landscape operating configuration and vice versa as the guide member moves along the first path segment, and the pivotable assembly pivots from the landscape operating configuration to a portrait operating configuration and vice versa as the guide member moves along the second path segment.

6. The electronic mobile device of claim 5, wherein the guide member is disposed at an intersection of the first path segment and the second path segment in the landscape operating configuration.

7. The electronic mobile device of claim 5, further comprising:
   a first cam partially defining the first axis and being connected to the pivotable assembly so as to pivot therewith; and
   a first follower supported by the linkage and engaging the first cam to bias the pivotable assembly toward the compact operating configuration and the landscape operating configuration.

8. The electronic mobile device of claim 7, further comprising:
   a second cam partially defining the second axis and being connected to the base so as to remain stationary therewith; and
   a second follower supported by the linkage and engaging the second cam to bias the pivotable assembly toward the landscape operating configuration and the portrait operating configuration.

9. The electronic mobile device of claim 8, further comprising a compression spring biasing the first follower and the second follower away from one another.

10. The electronic mobile device of claim 5, further comprising:
   a base cam partially defining the second axis and being connected to the base so as to remain stationary relative to the base; and
   a base follower supported by the linkage and engaging the base cam to bias the pivotable assembly toward the landscape operating configuration and the portrait operating configuration.

11. The electronic mobile device of claim 2, wherein the linkage remains stationary relative to the base as the pivotable assembly pivots about the first axis relative to the base, and wherein the linkage pivots relative to the base as the pivotable assembly pivots about the second axis relative to the base.

12. The electronic mobile device of claim 1, wherein the guide path is a guide slot and the guide member is a guide post that extends into the guide slot and moves therein as the pivotable assembly pivots relative to the base.

13. The electronic mobile device of claim 1, wherein the pivotable assembly includes a user interface device.

14. The electronic mobile device of claim 13, wherein the user interface device is a touch-sensitive display panel.

15. The electronic mobile device of claim 1, wherein the first axis and the second axis are generally parallel.

16. An electronic mobile device, comprising:
   a base;
   a linkage connected to the base so as to be pivotable about a base axis;

a pivotable assembly connected to the linkage so as to be pivotable about a pivotable assembly axis disposed apart from the base axis, the pivotable assembly including a user interface device;

a guide mechanism including:
- a guide member supported by one of the base and the pivotable assembly;
- a guide path defined by the other of the base and the pivotable assembly, the guide path including:
  - a first path segment along which the guide member moves relative to the guide path as the pivotable assembly pivots about the pivotable assembly axis relative to the base; and
  - a second path segment along which the guide member moves relative to the guide path as the pivotable assembly pivots about the base axis relative to the base.

17. The electronic mobile device of claim 16, wherein the linkage remains stationary relative to the base as the pivotable assembly pivots about the pivotable assembly axis relative to the base, and wherein the linkage pivots relative to the base as the pivotable assembly pivots about the base axis relative to the base.

18. The electronic mobile device of claim 16, wherein the pivotable assembly pivots from a compact operating configuration to a landscape operating configuration and vice versa as the guide member moves along the first path segment, and the pivotable assembly pivots from the landscape operating configuration to a portrait operating configuration and vice versa as the guide member moves along the second path segment.

19. An electronic mobile device, comprising:

a base;

a pivotable assembly including a user interface device and being pivotable relative to the base;

a linkage connected to the base so as to be pivotable about a base axis and connected to the pivotable assembly so as to be pivotable about a pivotable assembly axis;

a guide interface including:
- a guide member supported by one of the base and the pivotable assembly;
- a guide wall defined by the other of the base and the pivotable assembly, the guide wall defining:
  - a first path segment along which the guide member moves relative to the guide wall to permit the pivotable assembly to pivot about the pivotable assembly axis relative to the base and inhibit the pivotable assembly from pivoting about the base axis relative to the base; and
  - a second path segment along which the guide member moves relative to the guide wall to permit the pivotable assembly to pivot about the base axis relative to the base and inhibit the pivotable assembly from pivoting about the pivotable assembly axis relative to the base.

20. The electronic mobile device of claim 19, wherein the first path segment is defined by a first arc having a first radius, and the second path segment is defined by a second arc having a second radius different than the first radius.

* * * * *